US007921018B2

(12) United States Patent
Hong et al.

(10) Patent No.: US 7,921,018 B2
(45) Date of Patent: Apr. 5, 2011

(54) TRANSLATION SYSTEM AND METHOD OF PROVIDING TRANSLATION SERVICE

(75) Inventors: Mun Pyo Hong, Daejeon (KR); Young Kil Kim, Daejeon (KR); Young Ae Seo, Daejeon (KR); Chang Hyun Kim, Daejeon (KR); Seong Il Yang, Daejeon (KR); Sung Kwon Choi, Daejeon (KR); Ki Young Lee, Daejeon (KR); Oh Woog Kwon, Daejeon (KR); Yoon Hyung Roh, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 830 days.

(21) Appl. No.: 11/873,654

(22) Filed: Oct. 17, 2007

(65) Prior Publication Data

US 2008/0097743 A1    Apr. 24, 2008

(30) Foreign Application Priority Data

Oct. 19, 2006   (KR) .......................... 10-2006-0101934

(51) Int. Cl.
*G10L 21/00* (2006.01)
*G06F 17/28* (2006.01)
*G06F 17/21* (2006.01)

(52) U.S. Cl. ................. 704/277; 704/2; 704/10
(58) Field of Classification Search ................. None
See application file for complete search history.

(56) References Cited

U.S. PATENT DOCUMENTS

| | | | | |
|---|---|---|---|---|
| 5,497,319 A | * | 3/1996 | Chong et al. | 704/2 |
| 5,677,835 A | * | 10/1997 | Carbonell et al. | 704/8 |
| 6,278,967 B1 | * | 8/2001 | Akers et al. | 704/2 |
| 6,301,554 B1 | * | 10/2001 | Christy | 704/7 |
| 6,789,057 B1 | * | 9/2004 | Morimoto et al. | 704/2 |
| 6,789,093 B2 | * | 9/2004 | Obuchi et al. | 1/1 |
| 7,110,938 B1 | * | 9/2006 | Cheng et al. | 704/5 |
| 7,283,950 B2 | * | 10/2007 | Pournasseh et al. | 704/8 |

(Continued)

FOREIGN PATENT DOCUMENTS

JP        02-165264        6/1990

(Continued)

OTHER PUBLICATIONS

Notice of Allowance for Korean Application 10-2006-0101934.

(Continued)

*Primary Examiner* — Brian L Albertalli
(74) *Attorney, Agent, or Firm* — Lowe Hauptman Ham & Berner LLP

(57) ABSTRACT

A translation system is provided, which comprises: a translation server comprising guidelines for writing original text that serve as criteria for determining whether errors exist in the original text, an original text controller determining whether the original text conforms to the guidelines for writing original text, and a translation engine translating the original text with reference to at least one of a basic dictionary and a plurality of user dictionaries; a user interface comprising an original text processing part receiving and transmitting the original text to the translation server, a translated text processing part outputting the received translated text from the translation server and transmitting a result about whether to approve the corresponding translated text to the translation server, and a user dictionary editing part modifying contents of the user dictionary; and a user community server comprising an original text writing method shared database and a user dictionary shared database.

12 Claims, 2 Drawing Sheets

U.S. PATENT DOCUMENTS

| | | | | |
|---|---|---|---|---|
| 7,467,085 | B2 * | 12/2008 | Obuchi et al. | 704/246 |
| 2001/0029455 | A1 * | 10/2001 | Chin et al. | 704/277 |
| 2003/0176995 | A1 * | 9/2003 | Sukehiro | 704/2 |
| 2004/0102957 | A1 * | 5/2004 | Levin | 704/3 |
| 2005/0021322 | A1 | 1/2005 | Richardson et al. | |

FOREIGN PATENT DOCUMENTS

| | | |
|---|---|---|
| JP | 06-259466 | 9/1994 |
| JP | 08-329089 | 12/1996 |
| JP | 10-021239 | 1/1998 |
| JP | 10-171802 | 6/1998 |
| JP | 11015827 | 1/1999 |
| JP | 11-272672 | 10/1999 |
| JP | 2000-067050 | 3/2000 |
| JP | 2000-268034 | 9/2000 |
| JP | 2002-007395 | 1/2002 |
| JP | 2003-529845 | 10/2003 |
| JP | 2006-127356 | 5/2006 |
| KR | 1020000056245 | 9/2000 |
| KR | 1020010057781 | 7/2001 |
| KR | 1020040106156 | 12/2004 |
| KR | 1020050034688 | 4/2005 |

OTHER PUBLICATIONS

Office Action for Korean Application 2006-101934.

Japanese Office Action for application No. 2007-270535.

Munpyo Hong et al.; "Customizing a Korean-English MT System for Patent Translation"; The Tenth Machine Translation Summit; Proceedings of Conference; MT Summit X; Sep. 13-15, 2005; pp. 181-187.

* cited by examiner

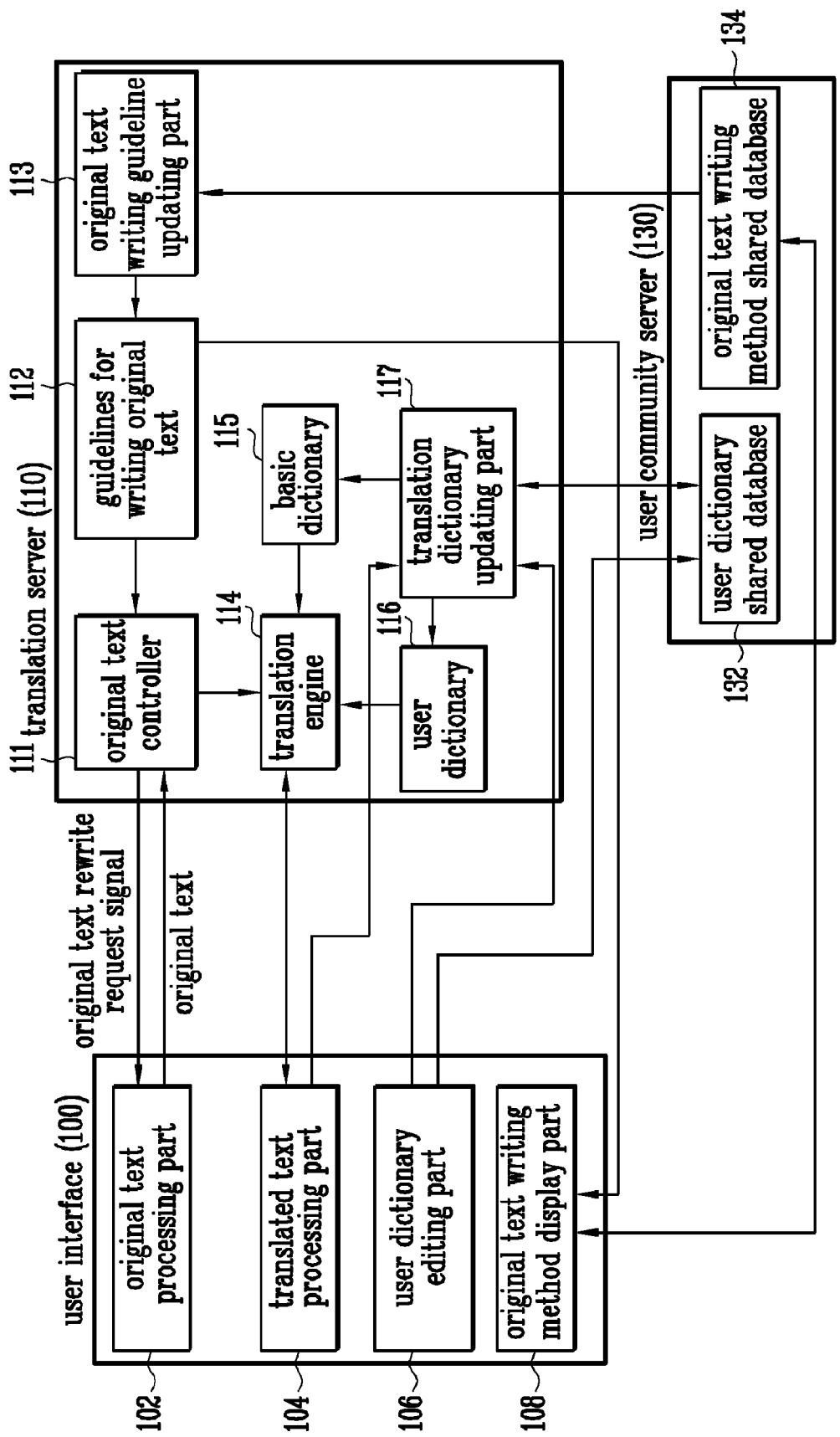

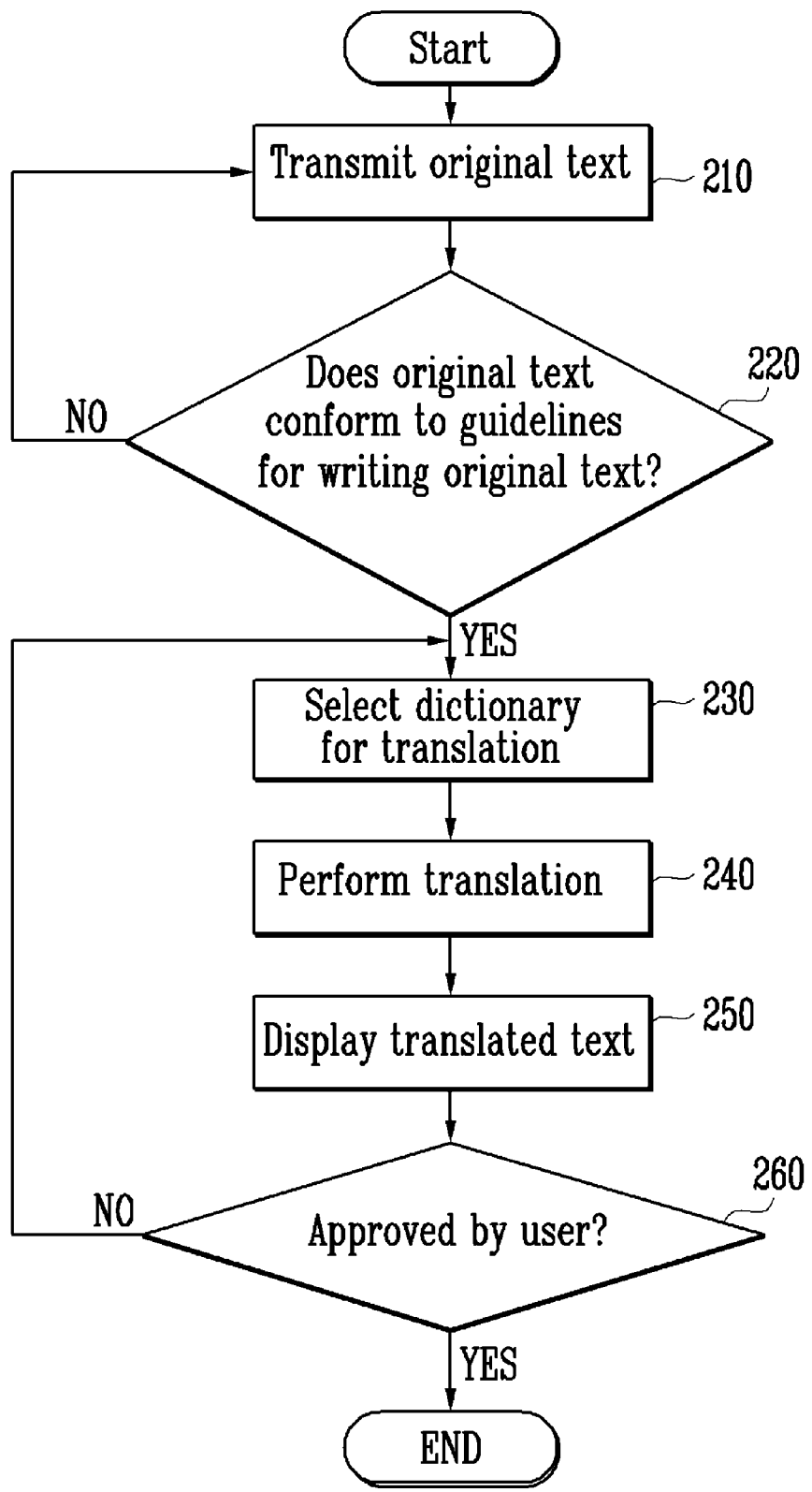

TRANSLATION SYSTEM AND METHOD OF PROVIDING TRANSLATION SERVICE

CROSS-REFERENCE TO RELATED APPLICATION

This application claims priority to and the benefit of Korean Patent Application No. 2006-0101934, filed Oct. 19, 2006, the disclosure of which is incorporated herein by reference in its entirety.

BACKGROUND

1. Field of the Invention

The present invention relates to a translation system and a method of providing translation service, and more particularly, to a translation system improving the reliability of a translated result by determining whether original text is properly written before translation by a translation engine and referring to a user dictionary edited by a user in addition to a standard basic dictionary for translation, and a method of providing translation service.

2. Discussion of Related Art

Machine translation systems automatically translating a document written in one language into another language have been used commercially for several years. However, research and inventions related to conventional machine translation systems have been concentrated on raising performance. That is, conventional inventions were mainly concerned with how the reliability of the translated result can be increased by raising each module's performance in the machine translation system. Also, there were attempts to obtain fast and exact translated results by connecting professional translators via a network system.

In Korean Patent application No. 2003-0037560 entitled "Translation Service System Using Network and Method of Providing Translation Service," text to be translated is first translated by a machine so as to standardize structures of sentences and technical terms of the overall text, and then translated again by a team of several translators. Even though the machine translation is first performed by this system, errors in the translated text follow as a natural consequence of errors in the original text. Also, the translation team becomes a key element, thereby increasing cost, and there may be difficulty in performing translation in real-time.

Meanwhile, Korean Patent Publication No. 2005-0034688, entitled "Machine Translation Method by Verifying Translation Ration and Human Proofreading and System for the Same," relates to a machine translation system for translating text in a mother language into a foreign language. More particularly, the invention relates to a machine translation method and a system for the same, in which an error rate is calculated by translating original text in a mother language into a foreign language and then reverse translating the translated text in the foreign language back into the mother language; a mother language translation environment defined by a dictionary database, grammar process algorithm, etc., used for a translation process is optimized to minimize the calculated error rate; and when the translation process meets a preset process environment improvement condition, human proofreading is requested, thereby reducing the load on the system and raising the reliability of the translation. However, even with this system, when the original text contains errors, it cannot be known what effect that will have on the above-mentioned error rate. Also, since human proofreading is ultimately a key element, just like in the other conventional art described above, it is difficult to translate text in real-time.

SUMMARY OF THE INVENTION

The present invention is directed to providing a translation system capable of performing real-time translation and a method of providing translation service. The translation system comprises a translation server including an original text controller correcting errors in the original text by determining whether there are errors in the original text before a translation process; and a translation engine capable of selecting from among various translation dictionaries used in the translation process for reference, according to a user's intentions.

One aspect of the present invention provides a translation system, comprising: a translation server comprising guidelines for writing original text that serve as criteria for determining whether errors exist in the original text, an original text controller determining whether the original text conforms to the guidelines for writing original text, and a translation engine translating the original text with reference to at least one of a basic dictionary and a plurality of user dictionaries; a user interface comprising an original text processing part receiving and transmitting the original text to the translation server, a translated text processing part outputting the received translated text from the translation server and transmitting a result about whether to approve the corresponding translated text to the translation server, and a user dictionary editing part modifying contents of the user dictionary; and a user community server comprising an original text writing method shared database and a user dictionary shared database.

Another aspect of the present invention provides a method of providing translation service, which comprises the steps of: receiving original text written in a mother language from a user's terminal; determining whether the received original text conforms to guidelines for writing original text; transmitting selection information for selecting a dictionary to be used as a reference in translation to the user's terminal, if the original text conforms to the guidelines for writing original text; receiving a selection signal selecting a specific dictionary for translation from the user's terminal; translating the text based on the dictionary for translation specified by the selection signal; transmitting output translated text to the user's terminal; and receiving a signal indicating whether to approve the translated text from the user's terminal.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 1 is a block diagram of a translation system according to the present invention; and FIG. 2 is a flowchart illustrating a method of providing translation service according to the present invention.

DETAILED DESCRIPTION OF EXEMPLARY EMBODIMENTS

The foregoing and other objects, features and advantages of the invention will be apparent from the following more particular description of exemplary embodiments of the invention, as illustrated in the accompanying drawings.

FIG. 1 is a block diagram of a translation system according to the present invention.

Referring to FIG. 1, the translation system comprises: a user interface 100 including an original text processing part 102, a translated text processing part 104, a user dictionary editing part 106, and an original text writing method display part 108; a translation server 110 including an original text controller 111, guidelines for writing original text 112, an original text writing guideline updating part 113, a translation engine 114, a basic dictionary 115, a user dictionary 116 and a translation dictionary updating part 117; and a user community server 130 including a user dictionary shared database 132 and an original text writing method shared database 134.

First, the user interface 100, which is included in a user's terminal, is connected with the translation server 110 by some sort of communication means such as the Internet, thereby enabling real-time data transmission.

The original text processing part 102 receives text that the user wants to translate sentence-by-sentence, and sends it to the original text controller 111 of the translation server 111. Also, when the original text sent to the original text controller 111 does not conform to the guidelines for writing original text, an original text rewrite request signal is transmitted from the original text controller 111. Accordingly, the original text processing part 102 serves to display whether the transmitted original text conforms to the guidelines for writing original text or not, and to display items to be modified included in the original text rewrite request signal to the user. The original text processing part 102 includes an input device such as a key board, and a communication system capable of sending input data to the translation server 110.

The translation process part 104 displays a translation result transmitted from the translation server 110 to the user. The user sees the translation result displayed on the translated text processing part 104, and then determines whether or not to approve the translation result. The translation process part 104 includes an output device such as a monitor, a reception system capable of receiving transmitted data from the translation server 110, and a communication system capable of sending data indicating whether or not to approve the translation result.

The user dictionary editing part 106 is an element for editing the user dictionary 116 included in the translation engine 114. The user dictionary 116, which will be explained in detail later, is a dictionary in the translation engine 114 that includes translated words and translation patterns used frequently in a domain specified by the user, and is provided in addition to the basic dictionary of the translation engine 114. The contents of the user dictionary 116 stored in the translation server 110 are also stored in a user interface to be edited by the user any time, and the edited result may be used to update the user dictionary 116 by the translation dictionary updating part 117 via the Internet. Meanwhile, by connection with the user dictionary shared database 132 stored in the user community server 130 provided to exchange information between users of the translation system of the present invention, the user may search all sorts of translated words and translation patterns uploaded in a community by other users, and directly transmit the searched results to the translation dictionary updating part 117 or edit the results in the user dictionary editing part 106 and transmit them to the translation dictionary updating part 117.

The original text writing method display part 108 receives a specific method stored in the original text writing method shared database 134, and specific contents of the guidelines for writing original text 112 stored in the translation server 110, and outputs them to the user. That is, in order that the users can refer to the guidelines for writing original text 112 stored in the translation server 110, the original text writing method display part 108 displays its contents on the user's terminal in writing the original text. Also, the original text writing method display part 108 may search all kinds of information of users stored in the original text writing method shared database 134 of the user community server 130, and display them.

Then, the translation server 110 including the original text controller 111 and the translation engine 114 is connected with a plurality of user's terminals by some sort of communication means such as the Internet, thereby enabling real-time data transmission.

The original text controller 111 compares the original text transmitted from the original text processing part 102 with the contents of the guidelines for writing original text 112: if the result of the comparison conforms to the guidelines for writing original text, transmits the original text data to the translation engine 114; and if not, transmits an original text rewrite request signal including inappropriate expressions, replaceable expressions, etc., to the original text processing part 102.

The guidelines for writing original text 112 are formed of stacking data such as Korean standard grammar, tips for writing technical documents, etc. A specific example is as follows:

Example

No more than 20 words in original text: count words in original text, and if over 20 words, request user to rewrite original text
No double-modifier structure
No double-object structure
Use adverbial postposition "uro" only to mean direction.

The original text controller 111 checks whether or not the original text is properly written by applying this example of guidelines for writing original text. An example of the aforementioned original text rewrite request signal will be given. This is an example regarding the adverbial postposition "uro" of the aforementioned guidelines.

Example of Misuse

As described in the drawing, the differential phase displacement value is not yet saturated, uro it is expected that higher differential phase displacement value could be acquired under higher DC voltage.—Here, the "uro" means "and", not direction.

Example of Correct Use

As described in the drawing, the differential phase displacement value is not yet saturated, and it is expected that higher differential phase displacement value could be acquired under higher DC voltage.

As such, the original text rewrite request signal displays the original text input by the user and incorrect parts, and thus the user can correct them.

Meanwhile, the contents of the guidelines for writing original text 112 may be modified by the original text writing guideline updating part 113. In the original text writing method shared database 134 stored in the aforementioned user community server 130, all kinds of methods of writing original text are stored and uploaded by the users of the translation system of the present invention while using the translation system. Particularly, a service provider may collect data on errors in the guidelines for writing original text itself or items to be changed, and thus modify them by the original text writing guideline updating part 113.

The translation engine 114 translates the original text data conforming to the guidelines for writing original text 112, which is transmitted from the original text controller 111, into a language of choice. The user dictionary 116 is further included in addition to the basic dictionary 115 as a reference for the translation.

The basic dictionary 115, which is provided by a provider of the translation server 110 of the translation system of the present invention, provides translated words and translation patterns based on general meanings of specific terms used in general domains.

On the other hand, the user dictionary 116 provides translated words and translation patterns based on specific meanings of specific terms used in specific domains. Particularly, if the user uses this system for translating a thesis, some terms used in the thesis may be specialized terminology or have different meanings from common usage; therefore, users may be allowed to input translated words and translation patterns corresponding to the terms by themselves. The user dictionary 116 is classified according to user by identifiers, stored in the translation server 110, and connected with the translation dictionary updating part 117 for updating of the user dictionary. Also, since the translated words and translation patterns may vary depending on the domains that the user mainly uses, one user may have a plurality of user dictionaries.

The translation dictionary updating part 117 receives updated contents from the user dictionary editing part 106 and the user dictionary shared database 132, and uploads the contents into the user dictionary 116.

The user may edit the uploaded contents through each user interface 100 in which the contents of the user dictionary 116 are stored, and upload the edited contents to the user dictionary 116 by the translation dictionary updating part 117. Meanwhile, as described above, the user may search through all kinds of translated words and translation patterns uploaded to the community by other users by connection with the user dictionary shared database 132 stored in the user community server 130, and directly transmit them to the translation dictionary updating part 117, or edit them in the user dictionary editing part 106 and then transmit them to the translation dictionary updating part 117.

The user community server 130 includes the user dictionary shared database 132 and the original text writing method shared database 134, which is capable of transmitting data in real-time by being connected to the plurality of users' terminals by some kind of communication means such as the Internet.

The user community server 130 is provided by the provider of the translation server 110 of the present invention, which includes the original text writing method shared database 134 capable of sharing knowledge on the method of writing the original text obtained in using the translation system by the users, and the user dictionary shared database 132 capable of sharing knowledge on translated words and translation patterns for specific terms.

The errors of the guidelines for writing original text 112, the best of the original text writing methods conforming to the guideline, and methods of writing the original text to most correspond to the original meaning of the text after translation is done, are stored in the original text writing method shared database 134 and posted on a community bulletin board by users. The contents include various user knowledge and experience, thereby providing the same quality of translation as the conventional art without the help of human translators, and enabling real-time translation.

Meanwhile, the data stored in the original text writing method shared database 134 may be data carrying a Web 2.0-based tag, which is recently in the spotlight. All kinds of data on characteristics of corresponding data are attached to the tag and also input by the users. For example, a user uploading a post on a method of properly writing an objective attaches a tag including the term, "an objective", to the corresponding post. The tag enables users to effectively search a user-specific post and find more appropriate information.

The users may be connected with the original text writing method shared database 134 by the aforementioned original text writing method display part 108 so as to search the methods of writing the original text suitable for the characteristics of the original text to be input, write the original text in accordance with the methods, and transmit the text to the translation server 110.

Meanwhile, in the user dictionary shared database 132, users' own dictionaries in which the users accumulate data while using the translation system are stored and shared with others. The user dictionary 116 provides translated words and translation patterns, which are formed based on specific meanings of specific terms used in specific domains, according to users' choices. Such a user dictionary may provide different translated words and translation patterns according to user, and optimal user dictionaries according to domain.

The user dictionary stored in the database may also include data carrying a Web 2.0-based tag. The tag may include information on a technical or scientific domain that the original text frequently belongs to, for each user. For example, when the user is to translate a document in the domain of "electrical and electronics", the user may search a user dictionary to which a tag containing these words is attached, and register it as the user dictionary 116 by the user dictionary updating part 117 to use for translation.

Particularly, this enables a person who has no technical knowledge about the corresponding domain to produce a translation of the same quality as produced by professional translators specializing in the corresponding domain, without any help, and in real-time.

The data stored in the user community server 130 enables the user to use knowledge accumulated in real-time without the help of human translators, which is essential in the conventional art, and output a translation having the same quality as produced by the conventional art.

Based on the above description, a method of providing translation service using the system of the present invention will now be explained.

FIG. 2 is a flowchart illustrating a method of providing translation service according to the present invention.

Referring to FIG. 2, the method of providing translation service includes the steps of: transmitting original text (S210); determining whether the original text conforms to guidelines for writing original text (S220); selecting a dictionary for translation (S230); running a translation engine (S240); displaying translated text (S250); and determining whether or not to approve the translated text (S260).

The user writes the original text by the original text processing part 102, and transmits it to the original text controller 111 of the translation server 110 (S210).

The original text controller 111 compares the transmitted original text with the guidelines for writing original text 112: if the text conforms to the guidelines, transmits the text to the translation engine 114, and if not, transmits a rewrite request signal to the original text processing part 102 (S220).

The user receiving the rewrite request signal in S220 inputs the original text again with reference to appropriate writing examples contained in the original text rewrite request signal, or all sorts of methods of writing original text contained in the original text writing method display part 108 (S210).

When it is determined that the original text conforms to the guidelines, and then is transmitted to the translation engine 114 in S220, a dictionary for translation to which the translation engine refers is selected (S230). To this end, the translation server transmits selection information on the dictionary for translation, which will be used as a reference in translation, to the user's terminal, wherein the selection information includes information on the basic dictionary 115 basically provided by a provider of the translation service and the plurality of user dictionaries 116 directly generated and stored in the translation server by users.

The user transmits a selection signal containing information on which dictionary will be specified as a dictionary for reference on the basis of the transmitted selection information, and translates the original text based on the dictionary for translation specified by the transmitted selection signal.

Meanwhile, while not illustrated in this drawing, the user may search for a new user dictionary which is suitable for the characteristics of the original text in the user dictionary shared database 132 and newly register it as the user dictionary by a translation dictionary updating part 117.

The translation engine is run and performs translation according to the selected dictionary for translation (S240). An output result may depend on which dictionary the translation server refers to.

The output result may be sent to the translated text processing part 104 in the user interface 100 and displayed on the user's terminal. Thereby, the user may approve or reject the result (S250).

The user transmits the signal containing the information on approval or rejection of the translation. When the translation server receives the approval signal for the translation, the process is terminated.

However, when the translation server receives the rejection signal, a control signal is received which replaces the dictionary for translation specified by the selection signal with one of the basic dictionary basically provided by the translation service provider and the plurality of user dictionaries directly generated and stored in the translation server by the users. And, the dictionary for translation is replaced according to the control signal and the translation is performed again. That is, if the basic dictionary is selected in the previous step, the user dictionary will be selected to perform translation in the next step, or vice versa.

In the meantime, when an additional user dictionary is needed, the user may search for a new user dictionary through the user dictionary shared database 132, and newly register and use it as a user dictionary by the translation dictionary updating part 117.

Also, the translation is performed again by receiving the control signal modifying contents of the user dictionary directly generated and stored in the translation server by users, among the dictionaries for translation specified by the selection signal, and by modifying the dictionary for translation according to the control signal. That is, the contents of the user dictionary are modified, and thus the translation may be performed again based on the modified user dictionary.

According to a translation system of the present invention, errors in original text may be corrected before translation, thereby raising the reliability of the translated result, and a plurality of user dictionaries capable of augmenting/modifying a dictionary to which a translation engine refers in accordance with a user's intentions may be registered, thereby obtaining a translated result that is true to the original meaning. Also, by a community server providing tags based on Web 2.0, an enormous amount of information corresponding to the knowledge and experience of users may be obtained. This enables the system to produce a translation of the same quality as produced by professional translators, without their help. Thus, real-time translation performance may be increased.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A translation system, comprising:
   a translation server comprising guidelines for writing original text that serve as criteria for determining whether errors exist in the original text, an original text controller determining whether the original text conforms to the guidelines for writing original text, and a translation engine translating the original text with reference to at least one of a basic dictionary and a plurality of user dictionaries;
   a user interface comprising an original text processing part receiving and transmitting the original text to the translation server, a translated text processing part outputting the received translated text from the translation server and transmitting a result about whether to approve the corresponding translated text to the translation server, and a user dictionary editing part modifying contents of the user dictionary; and
   a user community server comprising an original text writing method shared database and a user dictionary shared database.

2. The translation system according to claim 1, wherein the translation server further comprises a translation dictionary updating part, which updates the dictionaries or replaces a dictionary to which the translation engine refers with another dictionary.

3. The translation system according to claim 2, wherein the translation dictionary updating part receives a control signal for altering the dictionary to which the translation engine refers from the translated text processing part, thereby replacing the dictionary to which the translation engine refers with another dictionary.

4. The translation system according to claim 1, wherein the original text processing part in the user interface receives and transmits the original text sentence-by-sentence, and displays whether the original text conforms to the guidelines for writing original text.

5. The translation system according to claim 2, wherein the user dictionary editing part adds contents of a specified user dictionary stored in the user dictionary shared database of the user community server into the user dictionary by the translation dictionary updating part.

6. The translation system according to claim 1, wherein the user interface further comprises an original text writing method display part receiving and outputting the specific method of writing original text stored in the original text writing method shared database of the user community server and specific contents of the guidelines for writing original text stored in the translation server.

7. The translation system according to claim 1, wherein data stored in the user dictionary shared database and the original text writing method shared database of the user community server contains tags based on Web 2.0.

8. A method of providing translation service, comprising the steps of:

receiving original text written in a mother language from a user's terminal;

determining whether the received original text conforms to guidelines for writing original text;

transmitting selection information for selecting a dictionary to be used as a reference in translation to the user's terminal, if the original text conforms to the guidelines for writing original text;

receiving a selection signal selecting a specific dictionary for translation from the user's terminal;

translating the text based on the dictionary for translation specified by the selection signal;

transmitting output translated text to the user's terminal; and receiving a signal indicating whether or not to approve the translated text from the user's terminal.

9. The method according to claim 8, further comprising the step of:

if the original text does not conform to the guidelines for writing original text, transmitting an original text rewrite request signal to the user's terminal.

10. The method according to claim 8, wherein the step of providing selection information to the dictionary for translation comprises providing information on a basic dictionary basically provided by a translation service provider and a plurality of user dictionaries directly generated and stored in the translation server by users.

11. The method according to claim 8, further comprising the steps of:

upon receipt of a signal not to approve the translated text, receiving a control signal replacing the dictionary for translation specified by the selection signal with one of the basic dictionary basically provided by the translation service provider and the plurality of user dictionaries directly generated and stored in the translation server by users; and replacing the dictionary for translation according to the control signal and translating the original text again.

12. The method according to claim 8, further comprising the steps of:

upon receipt of a signal not to approve the translated text, receiving a control signal modifying contents of the user dictionary directly generated and stored in the translation server by users of the dictionary for translation specified by the selection signal; and modifying the dictionary for translation according to the control signal and translating the original text again.

* * * * *